(12) United States Patent
Voggenreiter et al.

(10) Patent No.: US 10,138,913 B2
(45) Date of Patent: Nov. 27, 2018

(54) PRESSURE CARTRIDGE (71) Applicant: ELEMENT SIX LIMITED, Shannon Airport (IE)

(72) Inventors: Maximilian Voggenreiter, Mainleus (DE); Thomas Heinrich Voggenreiter, Mainleus (DE); Michael Martin Petri, Mainleus (DE)

(73) Assignee: Element Six Limited, County Clare (IE)

( * ) Notice: Subject to any disclaimer, the term of this patent is extended or adjusted under 35 U.S.C. 154(b) by 1022 days.

(21) Appl. No.: 14/384,618

(22) PCT Filed: Mar. 22, 2013

(86) PCT No.: PCT/EP2013/056088
§ 371 (c)(1),
(2) Date: Sep. 11, 2014

(87) PCT Pub. No.: WO2013/144017
PCT Pub. Date: Oct. 3, 2013

(65) Prior Publication Data
US 2015/0053100 A1 Feb. 26, 2015

Related U.S. Application Data
(60) Provisional application No. 61/618,519, filed on Mar. 30, 2012.

(30) Foreign Application Priority Data

Mar. 30, 2012 (GB) .................................. 1205743.6

(51) Int. Cl.
*F15B 15/08* (2006.01)
*B30B 11/02* (2006.01)
(Continued)

(52) U.S. Cl.
CPC ............... *F15B 15/08* (2013.01); *B01J 3/067* (2013.01); *B30B 1/32* (2013.01); *B30B 11/004* (2013.01);
(Continued)

(58) Field of Classification Search
CPC ......... B30B 1/32; B30B 11/004; B30B 11/04; B30B 11/007; B30B 11/02; F15B 3/00;
(Continued)

(56) References Cited

U.S. PATENT DOCUMENTS 6,336,802 B1    1/2002  Hall
7,467,936 B2 *  12/2008 Hall .................... B01J 3/067
                                                    419/48

(Continued)

FOREIGN PATENT DOCUMENTS

JP    2001-150191 A    6/2001
JP    2006175297 A     7/2006

OTHER PUBLICATIONS

Ito, Eiji, et al., "A new 6-axis apparatus to squeeze the Kawai-cell of sintered diamond cubes, Physics of the Earth and Planetary Interiors," May 2009, pp. 264-269, vol. 174, Issues 1-4, ISSN: 0031-9201, Elsevier, Amsterdam, Netherlands (abstract submitted).

(Continued)

*Primary Examiner* — Jimmy T Nguyen
(74) *Attorney, Agent, or Firm* — Dean W. Russell; Clark F. Weight; Kilpatrick Townsend & Stockton LLP (57) ABSTRACT

A cartridge assembly having a chamber for containing hydraulic fluid, an intensifier element capable of reciprocating in the chamber and displacing the hydraulic fluid responsive to a drive system acting on the intensifier element, and a piston capable of reciprocating in the chamber and being displaceable responsive to a change in the pressure of the hydraulic fluid. The cartridge assembly is configured so that (Continued)

when the pressure in the fluid increases responsive to a first force being applied by the drive system on the intensifier, the hydraulic fluid will exert a second force on the piston, the second force being greater than the first force; the mass of the hydraulic fluid being substantially conserved within the cartridge assembly.

13 Claims, 6 Drawing Sheets

(51) Int. Cl.
    *B30B 1/32*     (2006.01)
    *B01J 3/06*     (2006.01)
    *B30B 11/00*     (2006.01)

(52) U.S. Cl.
    CPC ............ *B30B 11/007* (2013.01); *B30B 11/02* (2013.01); *Y10S 425/026* (2013.01)

(58) Field of Classification Search
    CPC ........ F15B 15/08; F15B 15/18; F15B 11/032; F15B 2211/40515; F15B 2211/428; F15B 2211/455; F15B 2211/46; F15B 2211/7052; F16K 31/1223; F16K 31/383; Y10S 425/026; B01J 3/067

USPC ......... 100/269.01, 270, 269.05; 60/560, 563, 60/591; 425/77

See application file for complete search history.

(56) References Cited

U.S. PATENT DOCUMENTS

| | | | |
|---|---|---|---|
| 7,513,764 B1 * | 4/2009 | Hall | ...................... B30B 11/004 419/48 |
| 8,066,500 B2 * | 11/2011 | Hall | ......................... B01J 3/067 419/48 |
| 2002/0025354 A1 | 2/2002 | Hall | |
| 2007/0040140 A1 | 2/2007 | Hall et al. | |
| 2008/0193579 A1 * | 8/2008 | Hall | ......................... B01J 3/067 425/77 |
| 2014/0356470 A1 * | 12/2014 | Vukovic | ............... B30B 11/004 425/77 |

OTHER PUBLICATIONS

International Patent Application No. PCT/EP2013/056088, International Search Report and Written Opinion dated Jun. 20, 2013, 10 pages.

* cited by examiner

PRESSURE CARTRIDGE

CROSS REFERENCE TO RELATED APPLICATIONS

This application is the U.S. national phase of International Application No. PCT/EP2013/056088 filed on Mar. 22, 2013, and published in English on Oct. 3, 2013 as International Publication No. WO 2013/144017 A1, which application claims priority to Great Britain Patent Application No. 1205743.6 filed on Mar. 30, 2012 and U.S. Provisional Application No. 61/618,519 filed on Mar. 30, 2012, the contents of all of which are incorporated herein by reference.

FIELD OF THE INVENTION

This disclosure relates generally to a cartridge assembly for generating pressure, particularly but not exclusively for an ultra-high pressure press.

BACKGROUND OF THE INVENTION

U.S. Pat. No. 6,336,802 discloses a unitary press frame and unitary cartridge with internal intensification. The cartridge body comprises a first chamber, a second high-chamber, and a connecting cylindrical passageway. Installed inside the first high chamber of the cartridge body are a plug and the internal fluid intensifier piston, the plunger of which is inserted into the cylindrical passageway. In normal operation of the press cycle, the pressurized fluid from an external pumping source is admitted into the first chamber via an inlet, forcing the internal fluid intensifier piston forward. The forward motion of the piston acts upon the fluid in the second high-chamber and urges the anvil/piston forward. As the anvil/piston comes in contact with a typical reaction cell, the fluid pressure from the external pumping source is increased in the first chamber causing amplified fluid pressure to build in the second chamber, behind the anvil/piston. The anvil/piston then acts as a mechanical intensifier of the pressurized fluid working on it, generating ultra high pressure at the anvil face.

There is a need for a more compact ultra-high pressure generation cartridge, preferably having reduced risk of hydraulic fluid losses. As used herein, an ultra-high pressure is at least about 1 GPa.

SUMMARY OF THE INVENTION

Viewed from a first aspect there is provided a cartridge assembly (for generating pressure), particularly but not exclusively for generating ultra-high pressure, comprising a chamber for containing hydraulic fluid, an intensifier element capable of reciprocating in the chamber and displacing the hydraulic fluid responsive to a drive means acting on the intensifier element, and a piston capable of reciprocating in the chamber and being displaceable responsive to a change in the pressure of the hydraulic fluid; the cartridge assembly configured so that when the pressure in the fluid increases responsive to a first force being applied by the drive means on the intensifier, the hydraulic fluid will exert a second force on the piston, the second force being greater than the first force; the hydraulic fluid being substantially conserved within the cartridge assembly (substantially no hydraulic fluid entering or leaving the cartridge assembly). The ratio of the second force to the first force will depend on the configuration of the piston and intensifier rod within the chamber according to known hydro-mechanical (hydraulic) principles.

Various arrangements and combinations are envisaged for cartridge assemblies by this disclosure, of which the following are non-limiting, non-exhaustive examples.

The cartridge assembly may comprise a housing. The cartridge assembly may comprise a chamber for containing hydraulic fluid, an intensifier rod capable of reciprocating in the chamber, a piston and an electro-mechanical drive means for driving the intensifier rod into the chamber and withdrawing it from the chamber.

The intensifier element may be attached at a proximate end to a ram external to the chamber, the ram being coupled to the drive means.

The drive means may comprise a servomotor coupled to a threaded beam having a longitudinal axis, the position of which is substantially fixed relative to the housing; the servomotor and the beam arranged such that rotation of the beam about its longitudinal axis can be selectively driven by the servomotor; the intensifier element being driveably coupled to the threaded beam by means of a cooperatively threaded mechanism, such that rotation of the beam will result in a longitudinal force being applied to the intensifier element via the threaded mechanism.

The intensifier element may be an elongate member such as a rod, which may be cylindrical in shape. The intensifier element may be attached to a ram at the proximate end, the ram being coupled to the drive means, which may comprise an electro-mechanical device. In some example arrangements, the drive means may comprise a servomotor such as a stepper motor. The servomotor may be coupled to a threaded beam, or to at least a pair of threaded beams, the position of which is fixed relative to the housing of the cartridge assembly. The servomotor and the beam may be arranged such that rotation of the beam about its longitudinal axis can be selectively driven by the servomotor. The servomotor and the beam may be attached to the housing. The ram may be coupled to the beam by means of a cooperatively threaded mechanism, such that rotation of the beam will result in a longitudinal force being applied to the ram via the threaded mechanism. The ram may thus be displaced in either direction along the longitudinal axis responsive to rotation of the beam. In other words, driven rotation of the beam or beams can be converted into longitudinal force on the ram, which may result in longitudinal displacement of the ram provided its longitudinal displacement is not prevented. Longitudinal displacement of the ram will result in longitudinal displacement of the intensifier element, resulting in longitudinal displacement of the distal end of the intensifier element located within the chamber. The first force may thus be applied to the intensifier element by the action of the servomotor. The drive means may comprise at least two or three threaded beams to which the ram will be coupled, which is likely to result in the drive means being more efficient and stable.

The housing may comprise a guide bore for the intensifier element, the guide bore connecting the chamber with the outside of the housing; the intensifier element located in the guide bore arranged with a proximate end located outside the housing and a distal end located within the housing; the cartridge assembly comprising a seal means arranged with respect to the housing and the intensifier element such that hydraulic fluid is substantially prevented from escaping from the chamber while the intensifier element is capable of reciprocating in the guide bore.

The piston may have a proximate end located inside the chamber, the proximate end of the piston abutting a seat defined by an inner surface of the chamber when the piston is fully inserted into the housing.

The piston may have a proximate end located inside the chamber and an opposite distal end, the piston comprising a receiver bore in the proximate end for accommodating part of the intensifier element adjacent the distal end of the intensifier element.

The housing may comprise a guide bore for the intensifier element and the piston comprises a receiver bore in the proximate end of the piston for accommodating part of the intensifier element adjacent the distal end of the intensifier element, the guide bore and the receiver bores being substantially aligned such that the intensifier element can extend from the guide bore and into the receiver bore.

The receiver bore and guide bore may be in communication with each other and substantially all hydraulic fluid in the chamber may be contained in a volume defined by the guide bore and the receiver bore when the piston is fully inserted into the chamber.

An anvil for impinging a body to be pressurised may be mounted onto the distal end of the piston. The anvil may be mounted onto an anvil holder, which may be mounted onto a position adjustment mechanism for adjusting the position of the anvil in the lateral plane, which may be mounted onto the distal end of the piston.

The housing may be configured for insertion into and coupling to a bore provided in a frame, for example a frame for a press apparatus such as an ultra-high pressure press apparatus, as may be used for the synthesis and or sintering of super-hard material such as diamond or cubic boron nitride (cBN) material.

Viewed from a second aspect there is provided a press system comprising a press frame and a cartridge assembly according to this disclosure.

The press system may be a cubic, tetrahedral or uni-axial press system, comprising six, four or two cartridge assemblies, respectively.

Certain disclosed cartridge assemblies may have the aspect of enhanced space that less space is required for housing the assembly. In addition, less high pressure tubing, fewer seals and sealing surface are likely to be required since there is no need to pump hydraulic fluid into and out of the cartridge assembly. The cartridge assembly may have reduced mass, and s likely to be easier to maintain.

BRIEF DESCRIPTION OF THE DRAWINGS

Non-limiting example arrangements will be described with reference to the accompanying drawings, of which

DETAILED DESCRIPTION

Figure 1A:
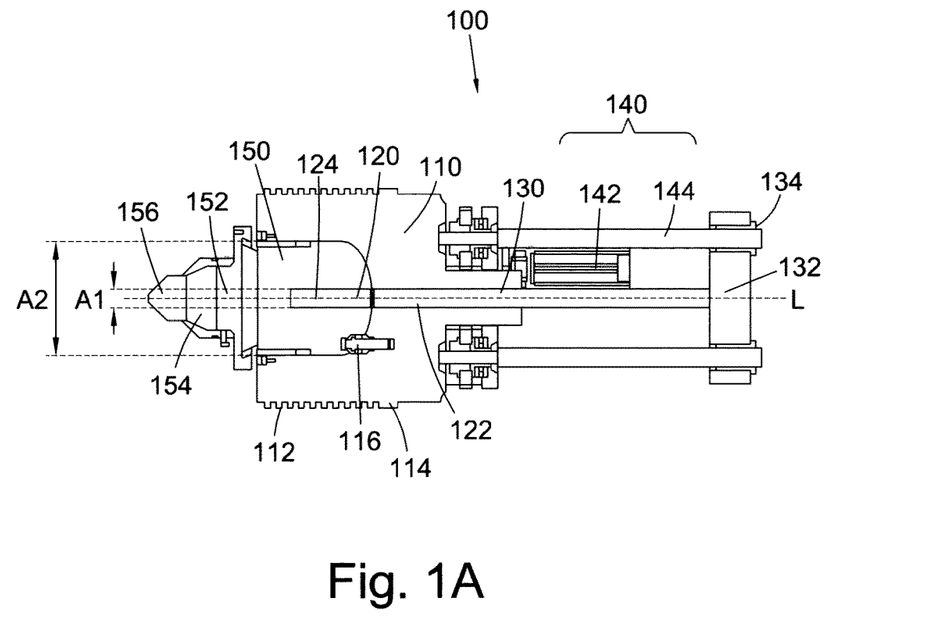
FIG. 1A shows a schematic cross section view of an example cartridge assembly in a fully withdrawn condition.
Figure 1B:
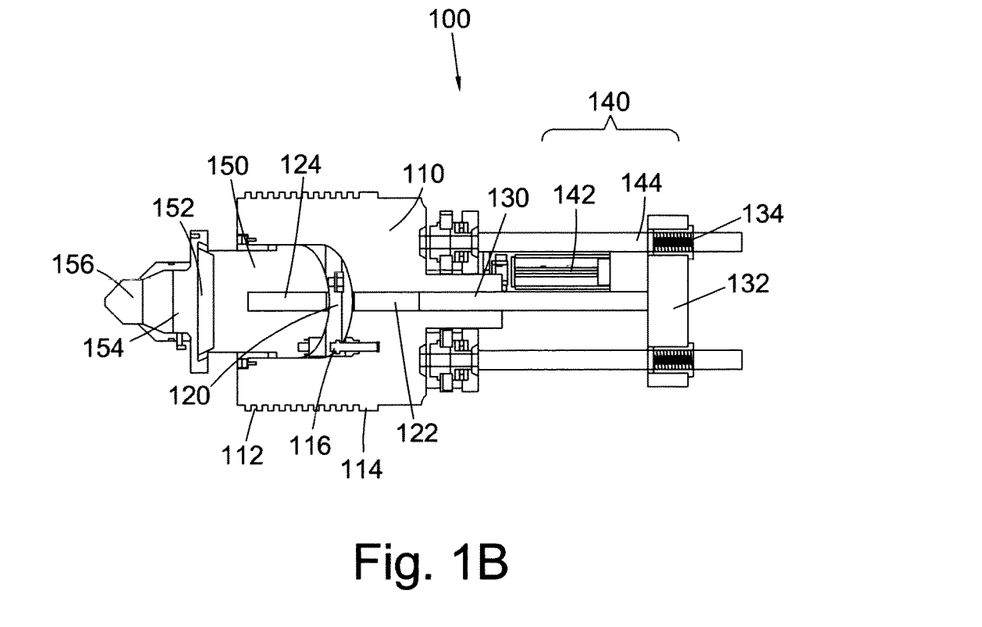
FIG. 1B shows a schematic cross section view of an example cartridge assembly in a fully extended condition.
Figure 1C:
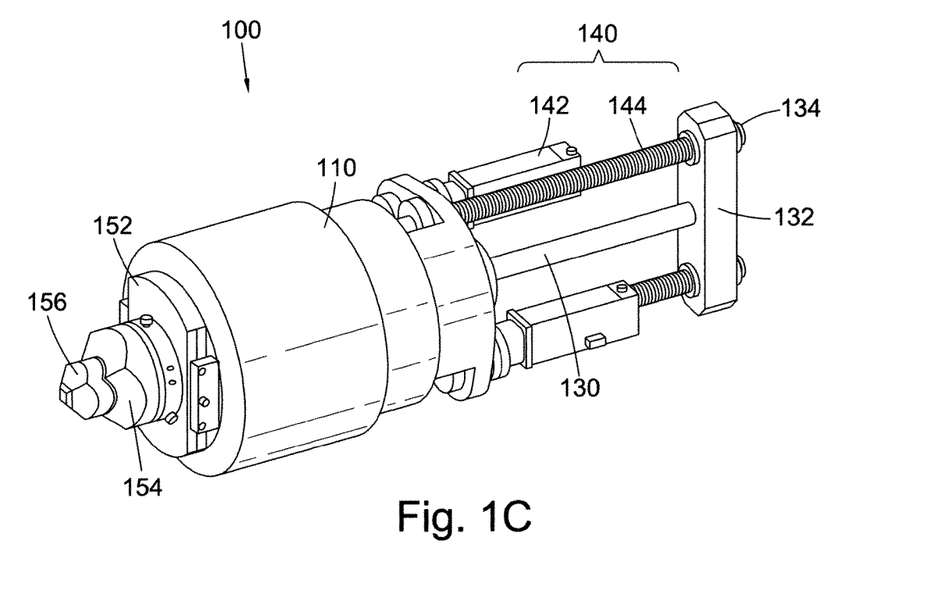
FIG. 1C shows a schematic perspective view of an example cartridge assembly.
Figure 2A:
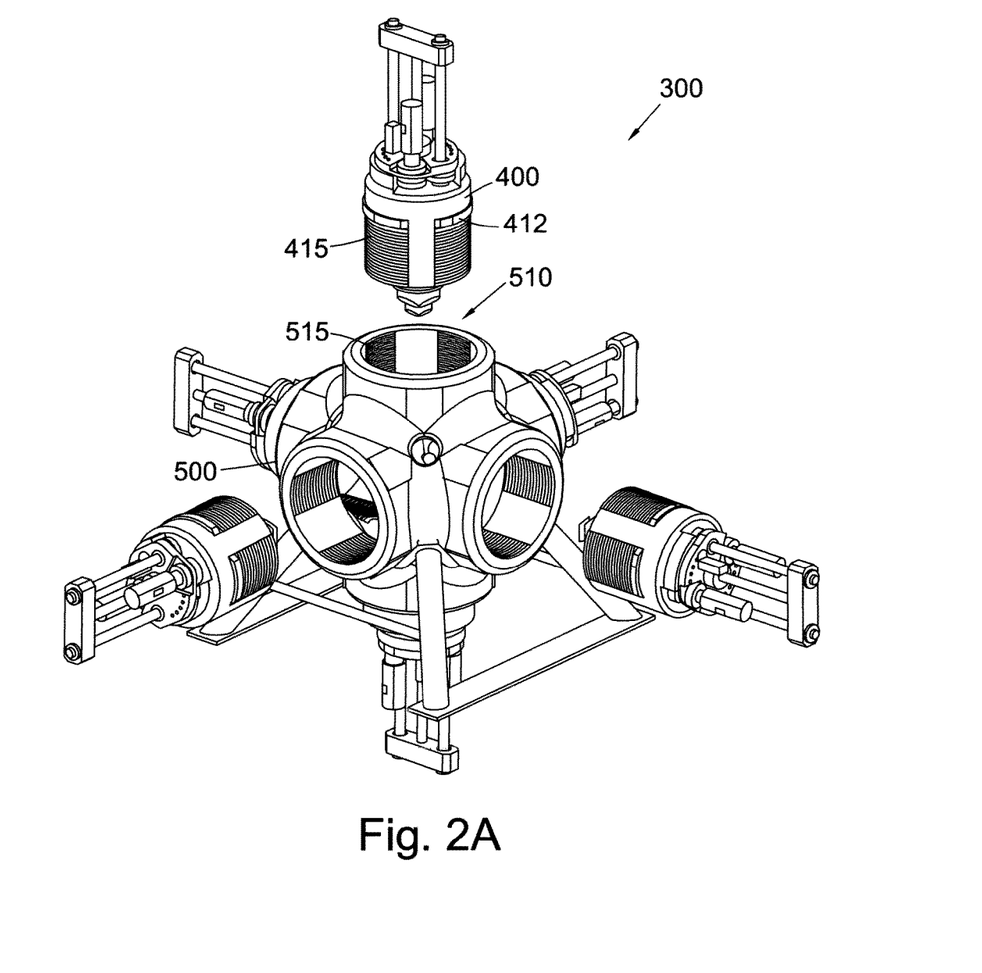
FIG. 2A shows a schematic side view of an example cubic press system, in which the cartridge assemblies are is withdrawn from press frame.
Figure 2B:
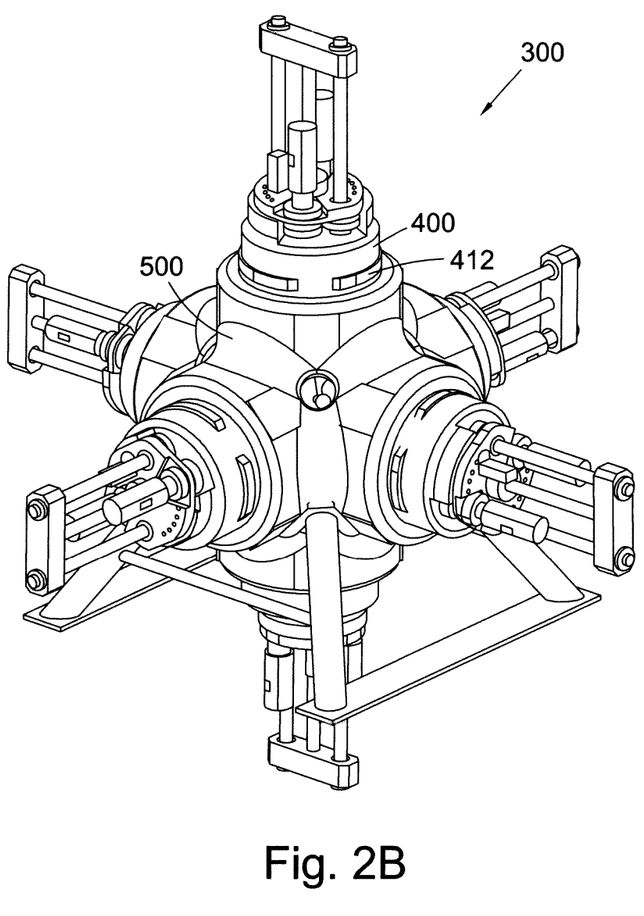
FIG. 2B shows a schematic side view of the example assembly of FIG. 2A, in which the cartridge assemblies are installed in the press frame.
Figure 2C:
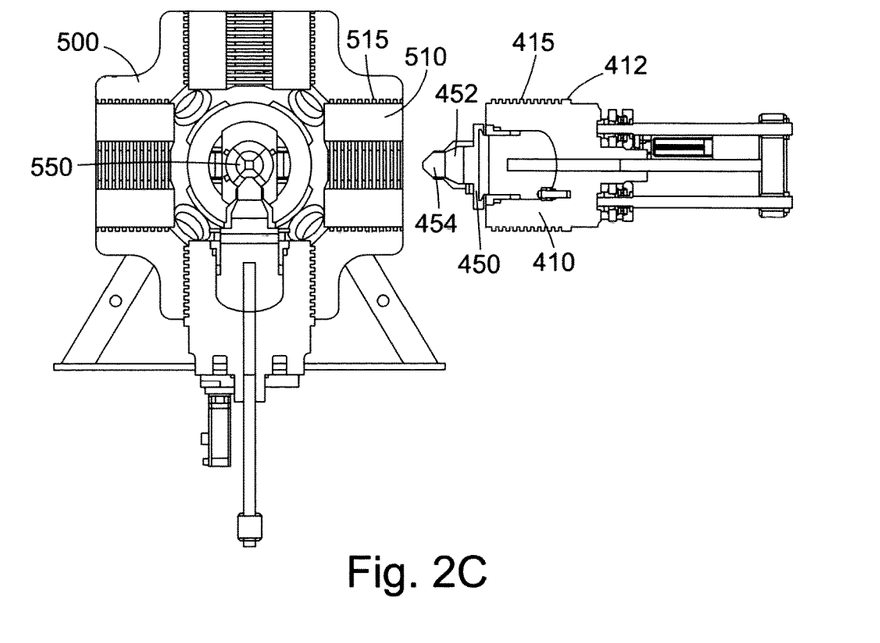
FIG. 2C shows a schematic cross section though the example press frame and one cartridge assembly of the cubic press system of FIG. 2A.
Figure 2D:
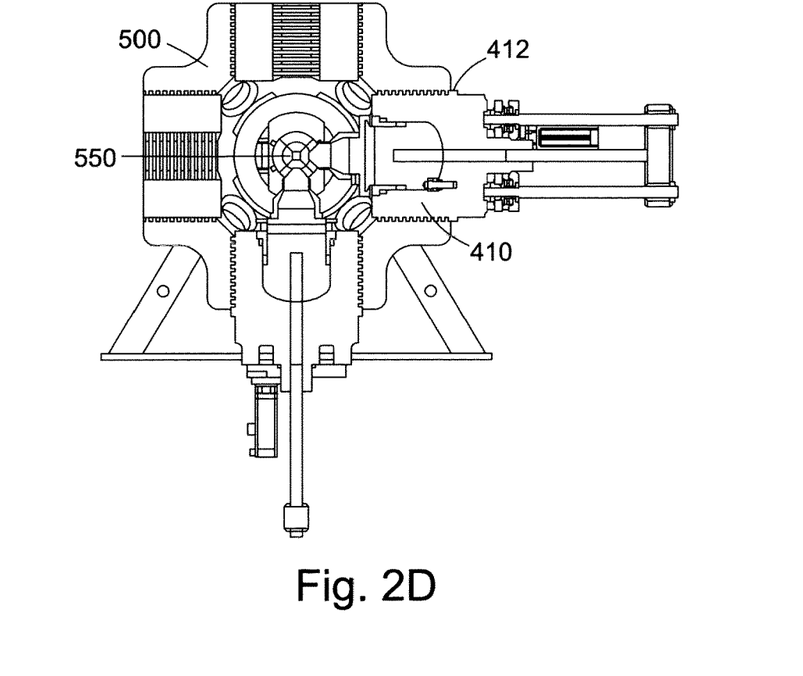
FIG. 2D shows a schematic cross section though the example press frame and one cartridge assembly of the cubic press system of FIG. 2A.
Figure 2E:
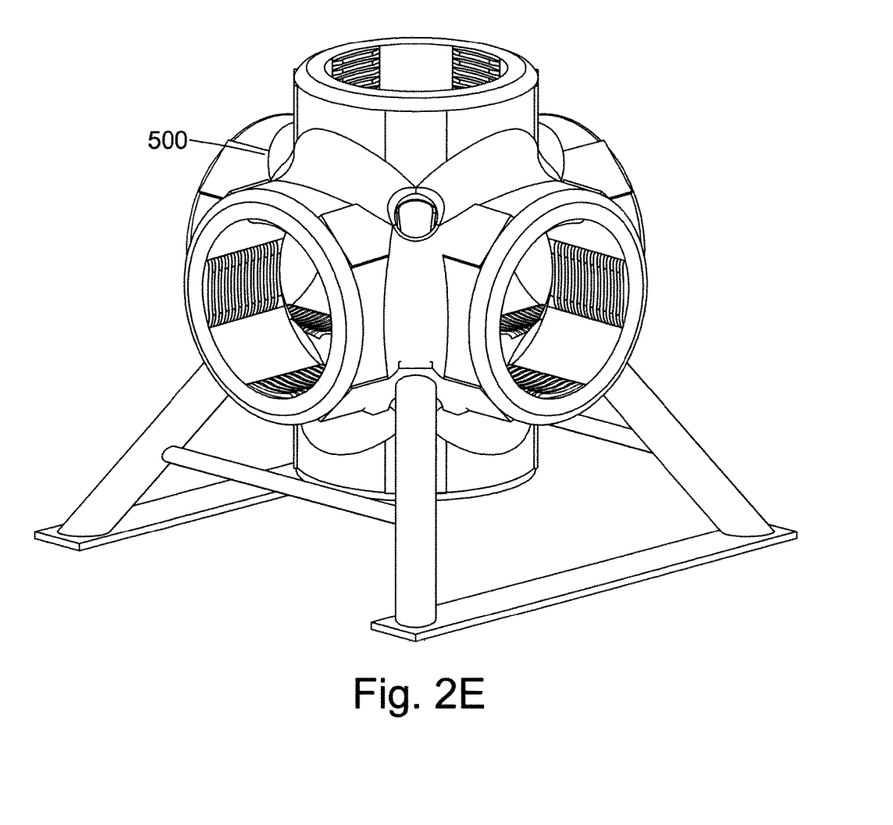
FIG. 2E shows an isometric perspective view of the cubic press frame of FIG. 2A.

With reference to FIG. 1A to FIG. 1C, an example arrangement of a cartridge assembly 100 for an ultra-high pressure press comprises a housing 110, a chamber 120 for containing hydraulic fluid, an intensifier rod 130 capable of reciprocating in the chamber 120, a piston 150 and an electro-mechanical drive means 140 for driving the intensifier rod 130 into the chamber 120 and withdrawing it from the chamber 120. As used herein, hydraulic fluid is a fluid medium by which power can be transferred in hydraulic machinery. Examples of hydraulic fluids include fluids based on mineral oil or water. The housing 110 comprises a guide bore 122 for the intensifier rod 130, the guide bore 122 connecting the chamber 120 and the outside of the housing 110. The intensifier rod 130 is located in the guide bore 122 and can reciprocate in it. A seal means is provided between the intensifier rod 130 and the guide bore 122 such that hydraulic fluid in the chamber 120 cannot escape from the chamber to the outside of the housing 110 when the intensifier rod 130 reciprocates in the guide bore 122 as in use. The piston 150 has a proximate end located within the chamber 120 and an opposite distal end located outside the chamber 120. A receiver bore 124 is provided into the proximate end of the piston 150 for accommodating the end of the intensifier rod 130 that can extend from the guide bore 122 and into the receiver bore 124. The receiver bore 124 is aligned with the guide bore 122 and when the piston 150 is fully inserted into the chamber 120 as illustrated in FIG. 1A, the receiver bore 124 is in direct communication with the guide bore 122 and thus in combination the receiver bore 124 and the guide bore 122 substantially define the entire volume of the chamber 120 available for containing hydraulic fluid. When the piston 150 is even slightly extended from the chamber as illustrated in FIG. 1B, a further volume opens up between the chamber wall and the proximate end of the piston 150. The chamber 120 can therefore comprise at least part of the guide bore 122, the receiver bore 124 and a volume between a wall of the chamber and the piston 150.

The rod 130 and piston 150 have respective areas A1 and A2 perpendicular to their respective axes of reciprocation (the same axis, in this example) and exposed to the hydraulic fluid in the chamber 120. The drive means 140 comprises a servo-motor 142 and at least two threaded beams 144 coupled to the servo-motor 142 such that they can be synchronously driven by the servo-motor 142 to rotate about their respective axes. The rod 130 is moveably coupled to each of the threaded beams 144 by means of a ram 132 comprising respective internally threaded coupling screws 134, the thread of the coupling screws 134 and the beams 144 being cooperatively configured such that when the beams 144 rotate, the coupling screws 134 are urged to move along the beams 144 in a direction determined by the direction of rotation of the beams 144 (i.e. either towards the housing 110 or away from it). Consequently, the ram 132 will be driven towards the housing 110 or away from it and the rod 130 will be driven into the chamber 120 or withdrawn from it.

When the rod 130 is driven a distance into the chamber 120, it will tend to compress hydraulic fluid in the chamber 120 with a force F1 applied by the drive mechanism 140 and to generate a pressure P in the hydraulic fluid. The piston 150 will experience a force of $(A2/A1) \times F1$ in the direction and be urged forward, according to the principles of hydraulic mechanics.

An anvil 156 may be mounted onto the forward end of the piston 150. The anvil 156 may comprise cemented tungsten carbide and be suitable for impinging a capsule for diamond synthesis or sintering. The foremost end surface of the anvil 156 for impinging the capsule may have an area A3. The pressure that the anvil is capable of generating on the capsule will be about $(A2/A1) \times F1/A3$. The anvil may be mounted on an anvil holder 154, which may be mounted onto an X-Y lateral position displacement stage for adjusting the lateral position of the anvil 156 in a plane perpendicular to the axis L and or rotationally about the axis L.

The housing 110 may comprise ridges, fins, projections or lobes 112 arranged on a circumferential side surface for securing it within a bore hole of a press (not shown) against longitudinal displacement along the axis L with respect to the bore hole, which will comprise cooperatively configured structures for the coupling. The housing may comprise lobes 114 for securing it against lateral (radial) displacement within the bore hole.

With reference to FIG. 2A to FIG. 2E, an example cubic press system 300 comprises a unitary steel frame 500 having six sides, each side provided with a bore hole 510 for accommodating a respective hydraulic cartridge 400. The press frame 500 has a substantially spherical central chamber 550 for housing a capsule to be pressurised. Each cartridge 400 is mechanically fastened to the press frame 500 by respective axial and radial fastening mechanisms. Each cartridge 400 comprises a generally cylindrical body 410 provided with components a radial fastening mechanism 412 and axial fastening mechanism 415. The corresponding bore hole 510 is also provided with complementary components for the radial and axial 515 fastening mechanisms. The axial fastening mechanism involves a plurality of ribs 415 on the body 410 of the cartridge 400 slotting between corresponding ribs 515 in the bore 510. There are three sets of ribs 415, 515 arranged on each cartridge body 410 and in each respective bore hole 510, the respective sets being equidistantly spaced apart from each other circumferentially around the cartridge body 410 on the one hand and the bore hole 510 on the other, each set comprising a respective series of ribs 415, 515 arranged axially along the cartridge body 410 on the one hand and the bore 510 on the other.

When a capsule has been loaded into the central chamber, the six cartridges may be energised to drive the respective anvils onto the capsule from each of the six directions. Load will thus be applied onto the capsule and onto the press frame (in the opposite direction) via the fastening mechanisms between the frame and the cartridges.

The same kind of radial fastening mechanism is provided at the front and back ends of each cartridge to secure it radially to the front and back ends of each respective bore. The radial fastening mechanism is designed to allow the cartridge to be freely inserted into (and withdrawn from) the bore when in the unlocked condition and to prevent the radial displacement of the cartridge when in the locked condition. Transition between the locked and unlocked conditions will involved rotating the cartridge by 60 degrees about its longitudinal axis. The radial fastening mechanism comprises three abutment lobes projecting radially outward from the cartridge and three corresponding abutment lobes projecting radially inward from the bore of the press frame. The three abutment lobes on the cartridge and on the press frame are equidistantly spaced apart around the circumference of the cartridge on the one hand and in the bore on the other. The abutment lobes on the cartridge and frame are configured and dimensioned so that when the cartridge is fully inserted in the bore and in the locked condition, the cartridge abutment lobes will radially abut those of the frame, the cartridge thus being prevented from substantial radial displacement.

When being inserted into the bore in the unlocked condition, the cartridge will be oriented with its abutment lobes circumferentially between those of the frame and there will be a clearance gap between the cartridge and the bore, including between their respective abutment lobes, so that the cartridge can be freely inserted and withdrawn without contacting the bore. Once inserted, the cartridge can be put into the locked condition by rotating it by 60 degrees, causing the respective abutment lobes to abut each other radially. At the same time, the axial securement mechanism will be engaged.

The invention claimed is:

1. A cartridge assembly comprising a housing having a single chamber for containing hydraulic fluid, an intensifier element capable of reciprocating in the chamber and displacing the hydraulic fluid responsive to a drive means acting on the intensifier element, and a piston capable of reciprocating in the chamber and being displaceable responsive to a change in pressure of the hydraulic fluid; the cartridge assembly configured so that when the pressure in the fluid increases responsive to a first force being applied by the drive means on the intensifier, the hydraulic fluid will exert a second force on the piston, the second force being greater than the first force; a mass of the hydraulic fluid being conserved within the chamber, the drive means comprising a servomotor coupled to a threaded beam having a longitudinal axis, a position of the threaded beam relative to the housing being fixed, the servomotor and the beam arranged such that rotation of the beam about its longitudinal axis can be selectively driven by the servomotor, the intensifier element being driveably coupled to the threaded beam by means of a cooperatively threaded mechanism, such that rotation of the beam will result in a longitudinal force being applied to the intensifier element via the threaded mechanism.

2. The cartridge assembly as claimed in claim 1, for an ultra-high pressure generator apparatus.

3. The cartridge assembly as claimed in claim 1, in which the intensifier element is aura cylindrical elongate member.

4. The cartridge assembly as claimed in claim 1, in which the intensifier element is attached at a proximate end to a ram external to the chamber, the ram being coupled to the drive means.

5. The cartridge assembly as claimed in claim 1, the housing comprising a guide bore for the intensifier element, the guide bore connecting the chamber with the outside of the housing; the intensifier element located in the guide bore arranged with a proximate end located outside the housing and a distal end located within the housing; the cartridge assembly comprising a seal means arranged with respect to the housing and the intensifier element such that hydraulic fluid is prevented from escaping from the chamber while the intensifier element is capable of reciprocating in the guide bore.

6. The cartridge assembly as claimed in claim 1, in which the piston has a proximate end located inside the chamber, the proximate end of the piston abutting a seat defined by an inner surface of the chamber when the piston is fully inserted into the housing.

7. The cartridge assembly as claimed in claim 1, in which the piston has a proximate end located inside the chamber and an opposite distal end, the piston comprising a receiver bore in the proximate end for accommodating a part of the intensifier element adjacent the distal end of the intensifier element.

8. The cartridge assembly as claimed in claim 1, in which the housing comprises a guide bore for the intensifier element and the piston comprises a receiver bore in a proximate end of the piston for accommodating a part of the intensifier element adjacent a distal end of the intensifier element, the guide bore and the receiver bore being aligned such that the intensifier element can extend from the guide bore and into the receiver bore.

9. The cartridge assembly as claimed in claim 8, in which the receiver bore and the guide bore are in communication with each other and substantially all hydraulic fluid in the chamber is contained in a volume defined by the guide bore and the receiver bore when the piston is fully inserted into the chamber.

10. The cartridge assembly as claimed in claim 1, comprising an anvil for impinging a body to be pressurised, the anvil mounted onto a distal end of the piston.

11. The cartridge assembly as claimed in claim 10, in which the anvil is mounted onto an anvil holder, which is mounted onto a position adjustment mechanism for adjusting the position of the anvil in a lateral plane, which is mounted onto the distal end of the piston.

12. The cartridge assembly as claimed in claim 1, in which the housing is configured for insertion into and coupling to a bore provided in a frame for a press apparatus.

13. The cartridge assembly as claimed in claim 12, in which the press apparatus is for a synthesis and or sintering of super-hard material.

* * * * *